UNITED STATES PATENT OFFICE.

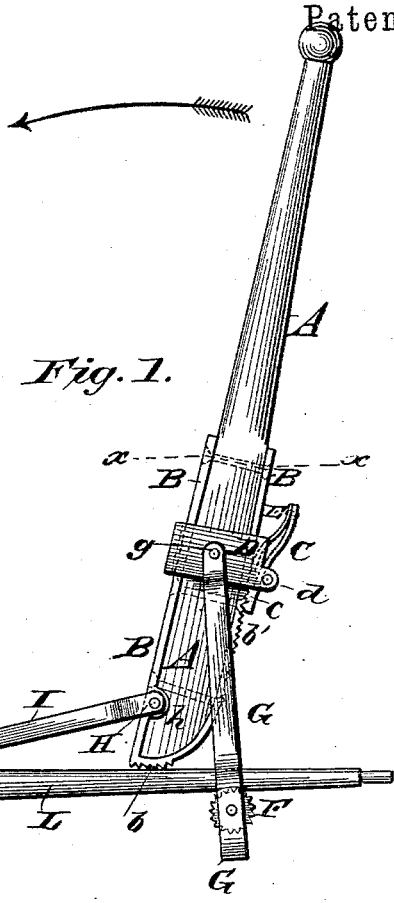

JOHN M. GERMANN, OF NEW YORK, N. Y.

SPOKE-DRAWER.

SPECIFICATION forming part of Letters Patent No. 381,690, dated April 24, 1888.

Application filed December 20, 1887. Serial No. 258,427. (No model.)

*To all whom it may concern:*

Be it known that I, JOHN M. GERMANN, of the city, county, and State of New York, have invented a new and Improved Spoke-Drawer, of which the following is a full, clear, and exact description.

My invention relates to an implement more especially intended for the use of carriage and wagon builders for drawing spokes from the hubs of wheels; and the invention has for its object to provide a simple, inexpensive, and efficient device of this character which may be conveniently operated by one man for quickly and easily drawing the spokes from the hubs of light or heavy wheels.

The invention consists in certain novel features of construction and combination of parts of the spoke-drawing implement, all as hereinafter described and claimed.

Reference is to be had to the accompanying drawings, forming a part of this specification, in which similar letters of reference indicate corresponding parts in all the figures.

Figure 1 is a side elevation of my improved spoke-drawer as applied to a spoke for drawing it from the hub of a wheel. Fig. 2 is a plan view, with the drawer-bar in section on the line x x, Fig. 1. Fig. 3 is an outer edge view of the implement, with the spoke shown in cross-section; and Fig. 4 is a perspective view of the main bar strap or iron and holding-pawl, hereinafter described.

The main bar or lever A of the spoke-drawing implement is fitted at its lower end with a metal strap, B, which extends over the rounded or quadrantal lower end of the bar and up along both front and rear edges of it, and is secured by bolts passed through the strap and bar. The strap is provided at the end of the bar A with exterior teeth, b, adapted to grip the upper face of a spoke, and at its outer or rear face the strap has a series of teeth, b', into which enter teeth c on a retaining pawl or catch, C, pivoted at d to lugs on a movable collar or sleeve, D, fitted loosely onto the bar and strap A B. The pawl C is pressed into engagement with the strap-teeth b' by a spring, E, held to the pawl and acting against the outer edge or wall of the collar D. It is obvious that by pressing the stem of the pawl and disengaging it from the teeth b' the collar D, with the pawl, may be readily slid along the bar and strap either way, and adjusted as may be necessary to set the lower spoke-gripping wheel, F, at any required distance from the end of the main bar. This wheel F is journaled at the lower end of a metal strap or stirrup, G, which is pivoted at the ends of its side bars by pins g to the opposite sides of the pawl-holding collar D; hence when the pawl is disengaged from the teeth b' of the strap B the stirrup may be adjusted with the collar to set the wheel F nearer to or farther from the teeth b on the strap B, as the thickness of the spokes to be drawn may require.

The inner side or arm of the strap B is provided with a transverse lug or projection, h, through which is passed a bolt or pin, H, which connects the inner forked end of a thrust-bar, I, to the lower end of the main bar or lever. This bar I has a head portion, J, shaped suitably to bear fairly against the hub K of a wheel, from which the spokes L are to be drawn.

The operation of the spoke-drawer is very simple and effective, and as follows: After the wheel is laid flat and the gripping-wheel F is adjusted, as above described, to suit the thickness of the spokes, the implement will be adjusted to each spoke to be drawn, as shown in Fig. 1 of the drawings, or with the strap-teeth b at the top of the spoke and the wheel F below it, and with the head J of the thrust-bar I resting against the wheel-hub, and as the operator, who stands on the wheel at its hub, pulls the outer upper end of the main bar A toward him the spoke will be securely clamped between the strap-teeth b and the wheel F, and will be easily drawn from the hub as the main bar swings in direction of the arrow on the thrust-bar pivot H as a fulcrum, the wheel F at the same time traveling on the spoke toward the hub of the wheel, and as will readily be understood.

Having thus described my invention, what I claim as new, and desire to secure by Letters Patent, is—

1. The combination, in a spoke-drawing implement, of a main bar adapted to bear on and grip one edge or face of a spoke, a stirrup held to the bar and adapted to grip the opposite edge or face of the spoke, and a thrust-bar connected to the main bar and adapted to bear on the wheel-hub, substantially as herein set forth.

2. The combination, in a spoke-drawing implement, of a main bar adapted to bear on and grip one edge or face of a spoke, a collar or sleeve adjustable on said bar, a stirrup held to the collar and adapted to grip the opposite edge or face of the spoke, and a thrust-bar connected to the main bar and adapted to bear on the wheel-hub, substantially as herein set forth.

3. The combination, in a spoke-drawing implement, of a main bar, A, a strap, B, fixed thereto and provided with teeth $b$, a stirrup, G, held to the bar A or a collar thereon, and provided with a gripping-wheel, F, and a thrust-bar, I J, pivoted to the main bar or its strap and adapted to bear on the wheel-hub, substantially as herein set forth.

4. The combination, in a spoke-drawing implement, of a main bar, A, a strap, B, fixed thereto and provided with teeth $b\ b'$, a collar or sleeve, D, fitted on the bar and provided with a pawl, C, engaging the teeth $b'$, a stirrup, G, pivoted to the collar D and provided with a gripping-wheel, F, and a thrust-bar, I J, pivoted to the main bar or its strap and adapted to bear on the wheel-hub, substantially as herein set forth.

JOHN M. GERMANN.

Witnesses:
HENRY L. GOODWIN,
C. SEDGWICK.